US012602049B2

(12) United States Patent

Ferrari et al.

(10) Patent No.: US 12,602,049 B2

(45) Date of Patent: Apr. 14, 2026

(54) AUTONOMOUS DRIVING SYSTEM THROUGH ROWS OF A PLANTATION

(71) Applicant: CNH Industrial America LLC, New Holland, PA (US)

(72) Inventors: Luca Ferrari, Modena (IT); Luca Di Cecilia, Modena (IT); Alessandro Davoli, Turin (IT); Giorgio Guerzoni, Turin (IT); Pasquale Di Viesti, Turin (IT); Emilio Sirignano, Turin (IT); Giorgio Matteo Vitetta, Turin (IT)

( * ) Notice: Subject to any disclaimer, the term of this patent is extended or adjusted under 35 U.S.C. 154(b) by 395 days.

(21) Appl. No.: 17/787,535

(22) PCT Filed: Dec. 21, 2020

(86) PCT No.: PCT/EP2020/087401

§ 371 (c)(1),
(2) Date: Jun. 20, 2022

(87) PCT Pub. No.: WO2021/123415

PCT Pub. Date: Jun. 24, 2021

(65) Prior Publication Data

US 2022/0382295 A1      Dec. 1, 2022

(30) Foreign Application Priority Data

Dec. 19, 2019    (IT) ........................ 102019000024685

(51) Int. Cl.
G05D 1/00          (2024.01)
A01B 69/04          (2006.01)
(Continued)

(52) U.S. Cl.
CPC ......... G05D 1/0257 (2013.01); A01B 69/008 (2013.01); G01S 13/08 (2013.01); G01S 13/89 (2013.01); G05D 1/0274 (2013.01)

(58) Field of Classification Search
CPC ............ G05D 1/0257; G05D 2107/21; G05D 2105/15; G01S 13/08; G01S 13/89; A01B 69/00
See application file for complete search history.

(56) References Cited

U.S. PATENT DOCUMENTS 9,921,064 B2 * 3/2018 Schleicher ............. G01C 21/10
2009/0204281 A1   8/2009 McClure et al.
(Continued)

FOREIGN PATENT DOCUMENTS

| CA | 2539354 | 9/2007 |
| EP | 1738631 | 1/2007 |
| EP | 3400798 | 11/2018 |

OTHER PUBLICATIONS

International Search Report and Written Opinion dated Mar. 31, 2021 for related International Application No. PCT/EP2020/087401 (12 pages).

*Primary Examiner* — Abby J Flynn
*Assistant Examiner* — Clint Pham
(74) *Attorney, Agent, or Firm* — Foley & Lardner LLP

(57) ABSTRACT

A method for identifying a trajectory between rows of a plantation using a radar interfaced with a processing means of an agricultural vehicle includes acquisition of an approximate distance between two consecutive rows of the plantation, acquisition of signals by the radar, processing of the signals to obtain a two-dimensional map of points corresponding to reflections picked up by the radar. The method further includes first linear interpolation to obtain a first interpolating line on the points of greatest intensity, second windowing of an elongated area of the two-dimensional map having an axis of development approximately parallel to the first interpolating line and at the approximate distance from the first interpolating line, second linear interpolation of a second interpolating line on points of greater intensity in the (Continued)

windowed area, and calculation of a trajectory parallel and intermediate between the first and second interpolating line.

9 Claims, 4 Drawing Sheets

(51) Int. Cl.
  *G01S 13/08* (2006.01)
  *G01S 13/89* (2006.01)

(56) References Cited

U.S. PATENT DOCUMENTS

| | | | |
|---|---|---|---|
| 2011/0002532 A1* | 1/2011 | Frakes | G06T 7/11 |
| | | | 382/154 |
| 2015/0253427 A1* | 9/2015 | Slichter | G01S 17/42 |
| | | | 356/5.01 |
| 2017/0174123 A1* | 6/2017 | Ogihara | B60Q 1/346 |
| 2018/0077865 A1* | 3/2018 | Gallmeier | G05D 1/0274 |
| 2018/0121750 A1* | 5/2018 | Borkowski | G01S 13/931 |
| 2018/0188366 A1* | 7/2018 | Kemmer | A01F 15/0825 |
| 2018/0325012 A1* | 11/2018 | Ferrari | A01B 69/001 |
| 2019/0041494 A1* | 2/2019 | Roger | G01S 7/352 |
| 2019/0059199 A1 | 2/2019 | Stanhope | |

* cited by examiner

AUTONOMOUS DRIVING SYSTEM THROUGH ROWS OF A PLANTATION

CROSS REFERENCE TO RELATED APPLICATIONS

This application is a U.S. National Stage filing of International Application Serial No. PCT/EP2020/087401 entitled "AUTONOMOUS DRIVING SYSTEM THROUGH ROWS OF A PLANTATION," filed Dec. 21, 2020, which claims priority to Italian Application Serial No. 102019000024685, filed Dec. 19, 2019, each of which is incorporated by reference herein in its entirety for all purposes.

FIELD OF THE INVENTION

The present invention relates to the field of autonomous driving systems, in particular to allow the vehicle to cross rows of a plantation, for example a vineyard, without damaging it.

STATE OF THE ART

In the field of agricultural vehicles, autonomous driving has been applied for some time. Generally, a vehicle performs autonomous operations in large plots of land using maps and geolocation.

When the vehicle has to move between rows of vineyards, greater precision is required than that obtainable through geolocation and it must also be taken into account that the vineyards can change during the seasons, and that the different plants along the rows can have different development locally changing the appearance of the row although the plants have been planted according to an alignment. Therefore, currently the vehicles that move between the rows of vineyards are driven by human operators, since, even if the plants have been planted along the rows, a relative development, during growth, can be unpredictable.

In addition, within the rows, GPS reception is sometimes weak or unreliable.

With "row" we mean an alignment of poles made of metal, wood or other material suitable to support the growth of the plants, which in turn are planted approximately aligned with the row.

The poles generally hold support cables for plants.

The "center of the row" refers to the aforementioned alignment of the plant support structures. Therefore, "center" is understood in the transversal sense of the longitudinal development of the plantation or vineyard.

Therefore, the need is felt to improve autonomous driving systems to make them suitable for driving a vehicle between rows of vineyards, minimizing the risk of damaging them. If not specifically excluded in the detailed description below, what is described in this chapter is to be considered as an integral part of the detailed description.

SUMMARY OF THE INVENTION

The object of the present invention is to present a row recognition technique.

The basic idea of the present invention is to combine the preliminary knowledge of the approximate distance between the rows and a two-dimensional map obtained from the "vision" of a radar.

Radars are based on microwave technologies, operating at various frequencies, for example 77-81 GHz.

This type of radar allows to determine an interval, an azimuth angle and a possible elevation angle, depending on the type of "front-end" used. The plants and the structures of the rows, for example, the concrete, metal or wood poles generate radar wave reflections with different intensities in relation to the material they are made of. The radar wave therefore manages to penetrate the fronds and the maximum reflection occurs where the concentration of foliage is greatest, that is, in the centre of the row, where the plants and their structures mostly reflect. In this way, it is possible to have a better identification of the centre of the row.

On the contrary, visual or LASER techniques, on the other hand, are reflected by the outermost branches and leaves, thus making it difficult to identify the centre of the row.

According to the present invention, this map is combined with the foreknowledge of the distance between two consecutive rows, allowing to estimate the alignment of the bases of the plants that make up the rows.

In other words, thanks to the present invention, it is possible to estimate the position of a medial straight line with respect to a row represented in a 2D map obtained by the radar.

Once two medial lines of two consecutive rows are known, then it is possible to identify an intermediate trajectory parallel to the medial lines of two consecutive rows.

The above 2D map is obtained through a processing of the signals obtained by the radar, in a way known per se.

The 2D map is preferably subjected to a thresholding operation according to which the points having intensity below a predetermined threshold are omitted. The threshold can be determined in a fixed or dynamic way according to the number of points it is desired to have in the map, from which it is intended to extract the position of the aforementioned medial lines.

The dependent claims describe preferred variants of the invention, forming an integral part of this description.

BRIEF DESCRIPTION OF THE DRAWINGS

Further objects and advantages of the present invention will become clear from the following detailed description of an example of its embodiment (and its variants) and from the attached drawings given purely by way of non-limiting explanation, in which.

The same reference numbers and letters in the figures identify the same elements or components.

In the context of this description, the term "second" component does not imply the presence of a "first" component. These terms are in fact used as labels to improve clarity and should not be understood in a limiting way.

The elements and features illustrated in the various preferred embodiments, including the drawings, can be combined with each other without however departing from the scope of this application as described below.

DETAILED DESCRIPTION OF EXEMPLARY EMBODIMENTS

According to a preferred variant of the invention, the radar is associated with an agricultural vehicle with its own receiving axis parallel to an advancing axis of the vehicle and that the vehicle is positioned approximately in a medial position between two rows, parallel to the same rows, by an operator. The vehicle comprises autonomous driving means programmed to drive the vehicle autonomously between the rows. According to the present invention, the radar acquires a "vision" disclosed in front of the vehicle.

Figures 1A, 1B:
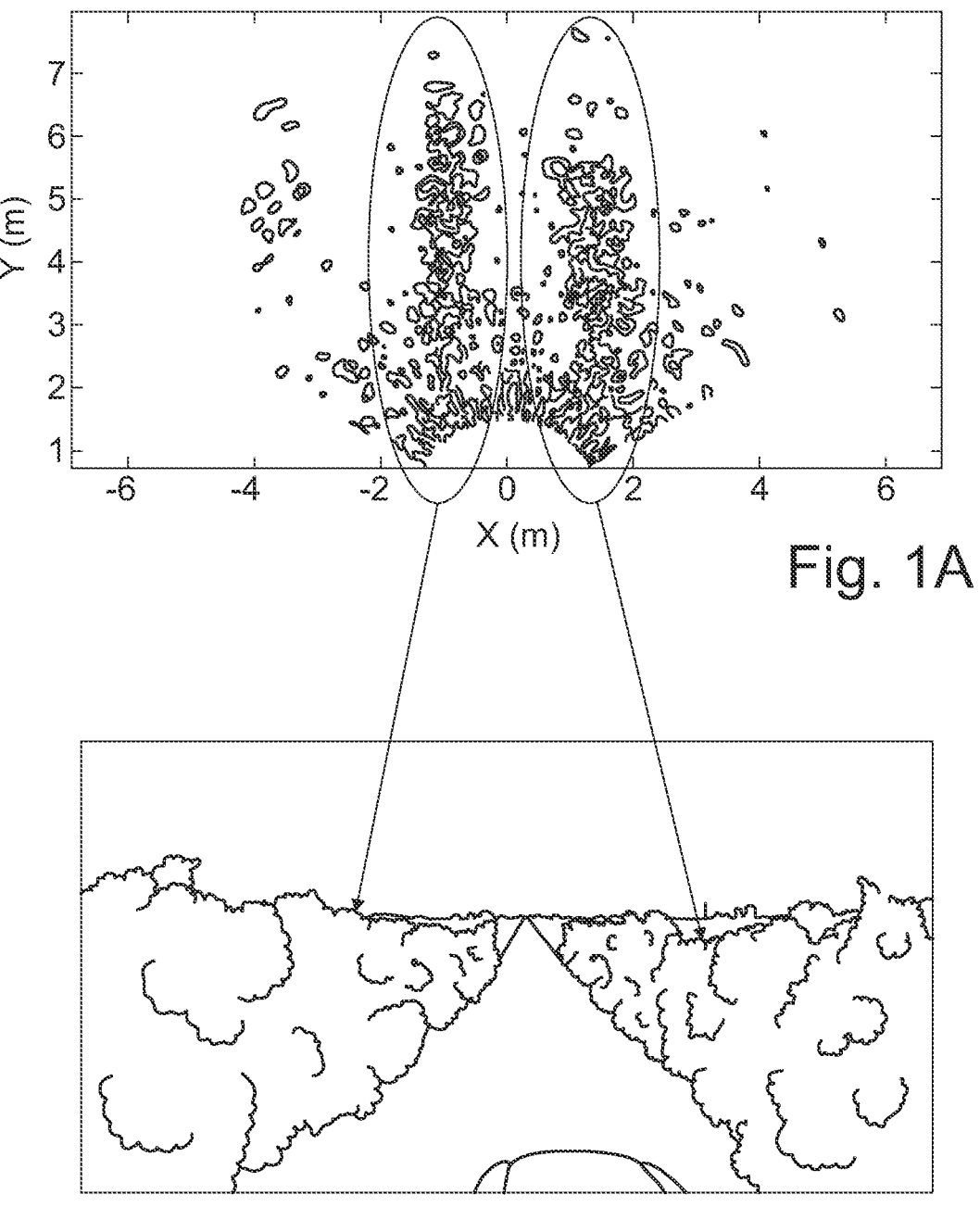
FIG. 1A shows an image obtained from a radar while the vehicle is arranged in front of rows of vineyards in a medial position and parallel to the development of the rows.
FIG. 1B shows a photographic recording of the same rows of vineyards that give rise to the image of FIG. 1.

The map of FIG. 1A is the result of a per se known processing of the signals generated by the radar. For example, the signals are subjected to two DFTs (Discrete Fourier Transformations) detailed below.

FIG. 1B represents a photographic recording of the same environment captured by a camera associated with the same vehicle of the present invention equipped with the radar which allowed the generation of the 2D map of FIG. 1A.

The arrows show the relationship between the presence of the rows and the distribution of the points in the 2D map of FIG. 1A.

According to a first preferred variant of the invention, the 2D map is windowed knowing the distance D between the two rows and knowing that the vehicle is arranged approximately in a medial position between the two adjacent rows.

Figure 2:
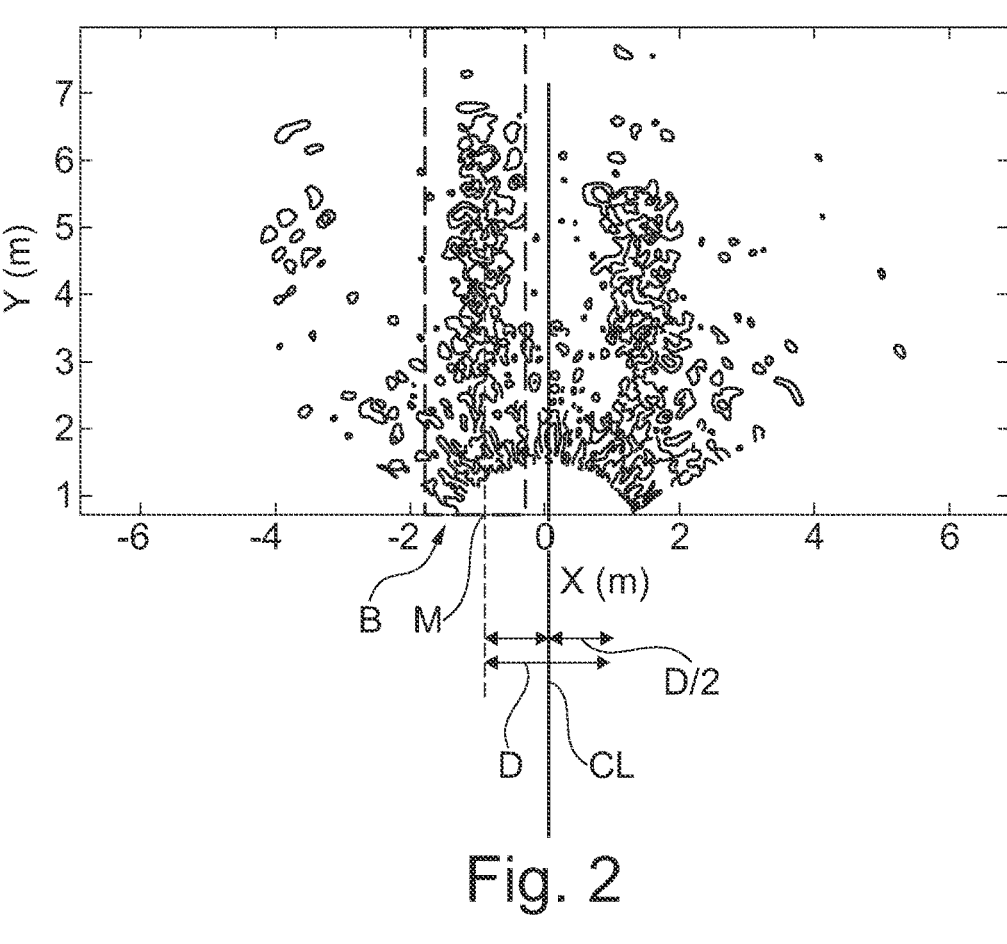
FIG. 2 shows a first operation carried out on the image of FIG. 1A.

This medial position of the vehicle is shown schematically in FIG. 2 with the centre line CL drawn on the 2D map for an easier understanding of the invention.

At approximately $D/2$ to the left and $D/2$ to the right there must be a row and therefore an interpolating line of points of FIG. 1A relating to one of the two rows.

The window consists in extracting a first portion of the map having a rectangular shape with a predetermined width, for example 40-60 cm, and a longitudinal development parallel with the ordinate axis of the 2D map. The width of the window rectangle can also be chosen as a function of the variance calculated along directions parallel to the abscissa axis.

A fair width of the window makes this method immune to any imperfect alignment of the vehicle (and radar) with the rows.

This derives from the fact that the reflections vary according to the vegetative state of the plants. For example, in winter, when the foliage of the plant is scarce, the reflections are concentrated at the centre of the row, while in summer, when the foliage is plentiful, there are more scattered reflections, as the foliage itself is an element of reflection.

The width of the window defines a minor base B with a medial point M, which is placed at the half-distance $D/2$ to the left and/or right with respect to the position of the vehicle CL.

Alternatively, the first window can be made by centring a relative major axis on a point of maximum intensity of the reflections captured by the radar. In other words, considering that the rectangle has a longitudinal shape, the major axis of the rectangle must fall on a point of maximum intensity and be approximately parallel to the ordinate axis. As described below, the first windowing is not essential.

Figure 3:
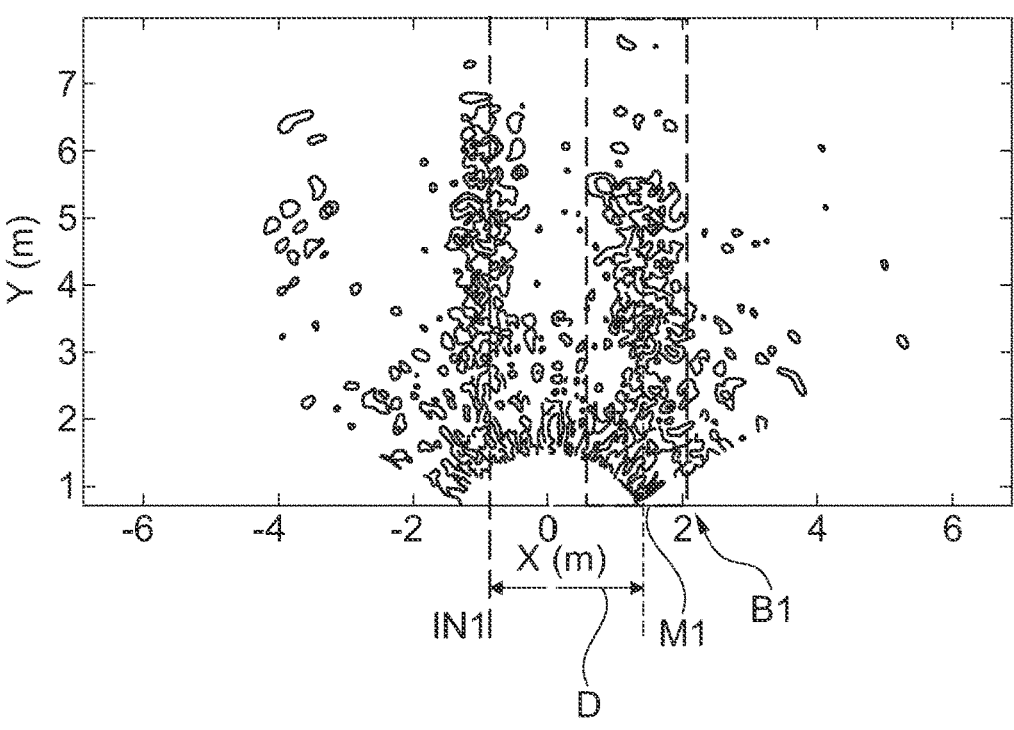
FIG. 3 shows a second operation carried out on the image of FIG. 1A, consequent to the operation of FIG. 2.

In this portion of the map, a weighted interpolation of the points of maximum intensity in the windowed area is carried out, obtaining a first interpolating straight line IN1 approximately parallel with the ordinate axis of the 2D map. With reference to FIG. 3, if the first window has been made in the left (or right) half of the 2D map, then a second window is made in the right (or left) portion of the 2D map by centring the medial point M1 of the base B1 of the second windowing. In other words, the major axis of the second rectangle is arranged at a distance D from the first interpolating straight line IN1. It is not essential that the windows are rectangular. It is sufficient that they have an elongated shape, for example an ellipsoid.

If the first interpolation is made without any windows, then it is possible to identify two areas, to the right and left of the first interpolating line. One of the two areas can be excluded by selecting the area that has a greater number of points than the other.

Figure 4:
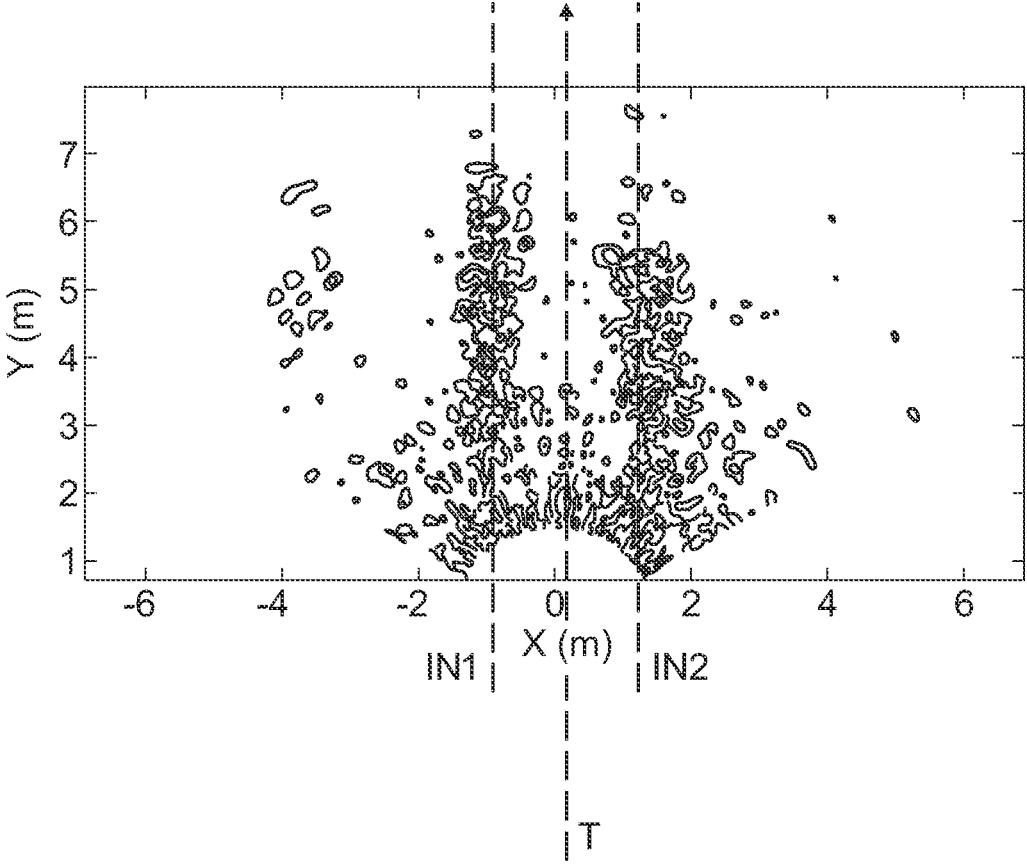
FIG. 4 shows a result of the operations exemplified in FIGS. 2 and 3.

It is therefore evident that in this case the position of the vehicle CL no longer has great relevance for the windows and therefore also for the extraction of the second interpolating straight line IN2, shown in FIG. 4.

If the distance between the two interpolating lines IN1 and IN2 is approximately equal to D, less than a tolerance value, then the procedure stops, otherwise it can proceed by iterating in order to calculate a new left (or right) interpolating line IN1' in a window positioned at a distance D from the right interpolating straight line IN2 and vice versa, as long as the interpolating straight lines are at a mutual distance of approximately D and at the same time having a higher interpolation coefficient. In particular, it is desired to maximize the two interpolation coefficients, choosing the pair of straight lines that satisfies this condition. This can be achieved by means of a so-called "matching filter".

Although the symbols IN1' and IN2' are not shown in the figures, the quotation marks "'" indicate the iteration step of the procedure exactly as for the steps described below with reference to the flow chart in FIG. 5.

According to a second preferred variant of the invention which is based on the first variant, after having calculated the first straight line IN1 and second interpolating straight line IN2, the first interpolating straight line IN1' is recalculated by varying the threshold described above, until two lines whose distance is closest to the predetermined one D and/or which maximizes the interpolation coefficients.

According to a third preferred variant of the invention, in a first step the first pair of interpolating straight lines IN1 and IN2 are calculated. In a second phase, the interpolating straight lines are recalculated independently again, by previously varying the thresholding. After having performed the recalculation a certain number of times, the pair of interpolating straight lines is chosen whose distance is closest to the predetermined distance D and/or which maximize the interpolation coefficients.

According to the second and third variant, it is possible to calibrate the pre-processing of the radar image on the peculiarities of the reflections (scattering) of the vineyard that depend on the fact of having, for example, metal, concrete and wood poles.

After the previous steps, the vehicle has identified the trajectory T to follow in order not to damage the vineyard as it crosses it.

Obviously, the trajectory T is a straight line approximately parallel and medial between the interpolating lines IN1 and IN2.

According to a preferred variant of the invention, the autonomous driving system continuously updates the medial position of the right and left rows, calculating new interpolating lines and weighing the position of the new interpolating lines on the basis of those obtained previously as the vehicle advances.

Similarly, the vehicle can calculate new trajectory lines T and weigh them on those previously followed. This avoids sudden variations in the estimation of the position of the rows.

As an alternative to the windowing, the application of appropriate filtering can be envisaged, for example CFAR (Constant false alarm rate) which allows to clean up the 2D map and perform at least one of the interpolations without having previously windowed.

Figure 5:
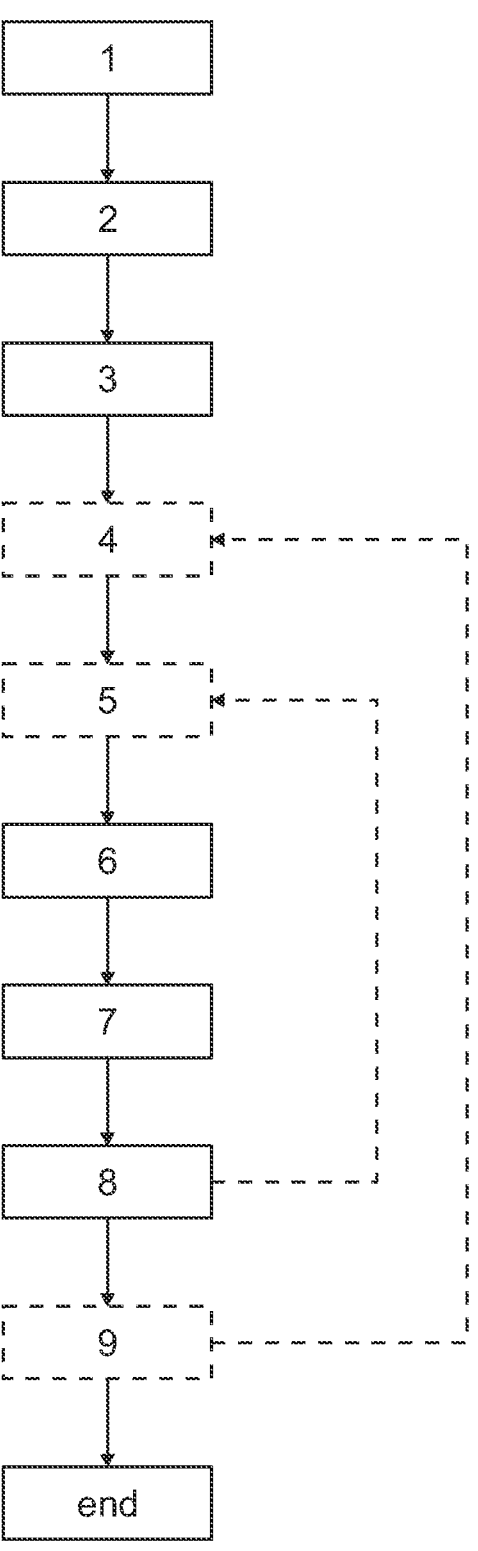
FIG. 5 shows an exemplary flow chart of the method of the present invention, in which blocks and dashed connections are optional, furthermore, in the following description the quotation marks "" indicate a repetition of the same step in a cyclic iteration.

FIG. 5 presents an exemplary flow chart of the method object of the present invention for identifying a trajectory between rows of a plantation by means of a radar interfaced with processing means of an agricultural vehicle. The method comprises the following steps in the same order:

(Step 1) acquisition of an approximate distance (D) between two consecutive rows of the plantation, (Step 2) acquisition of signals by said radar, (Step 3) processing of said signals to obtain a two-dimensional map of points corresponding to reflections captured by said radar, (Step 6) first linear interpolation to obtain a first interpolating line (IN1) on the points of greatest intensity, (Step 7) second window of an elongated two-dimensional map area having a development axis approximately parallel to said first interpolating line and to said approximate distance (D), (Step 8) second linear interpolation of a second interpolating line (IN2) on points of greater intensity in the windowed area, (Step end) calculation of a parallel and intermediate trajectory (T) between said first and second interpolating lines.

An example of a preferred implementation of the present invention is described below.

This section presents a technique for detecting the vineyard profile using the data collected with a FMCW (Frequency Modulated Continuous Wave) MIMO radar—from the Anglo-Saxon acronym "Multiple Input Multiple Output"—which works at a carrier frequency of about 77 GHz.

The radar comprises numerous elements (antennas) both on the transmission side and on the receiving side that are able to radiate and receive a UWB ultra-wideband signal by linearly sweeping the frequencies contained in a certain frequency range in the order of GHz, for example 76-78 GHz.

The signals received by the radar are processed to identify various objects and estimate their position: this information is contained in the spectral components of the received signals.

For simplicity, consider a radar with a Uniform Linear Array (ULA), and consider a horizontal spacing between adjacent antennas equal to d.

Consider the general case when L objects are present in the examined area, i.e. irradiated, by the radar, and consider the signal captured by the receiving element (antenna) p-th when a UWB signal is radiated by one of the available transmitting antennas. In this case, the n-th sample of the received signal—with n=0, 1, . . . , N−1, where N represents the total number of signal samples acquired at the sample rate $1/T_s$—can be expressed as:

$$x_p[n] = \sum_{l=0}^{L-1} a_{p,l}\cos(2\pi f_{p,l} nT_s + \psi_{p,l}) + w_p[n], \tag{1}$$

-continued where $$\psi_{p,l} = 2\pi f_0 \tau_{p,l} - \pi\mu\tau_{p,l}^2 \approx 2\pi f_0 \tau_{p,l}, \tag{2}$$

and $$f_{p,l} = \mu\tau_{p,l} \tag{3}$$

with $$\mu = \frac{B}{T_S} \tag{4}$$

where B is the bandwidth of the radiated signal and Ts is the scan time, e $\tau_{p,l}$, $\psi_{p,l}$ e $a_{p,l}$, represent the delay, phase and amplitude, respectively, associated with the l-th object. In addition, $w_p[n]$ represents the n-th sample of additive white Gaussian noise (AWGN) that hits the p-th receiving antenna. It is assumed that all elements of the noise sequence $\{w_p[n], n=0, 1, \ldots, N-1\}$ have zero mean and variance $$\sigma_w^2.$$

It is also worth remembering that the delay can be expressed as $$\tau_{p,l} = \tau_l + \Delta\tau_{p,l} \tag{5}$$

where $$\tau_l = \frac{2}{c}R_l \tag{6}$$

$R_l$ is the range of the l-th object, i.e. its distance from the centre of the radar array, while the variable part is represented by $$\Delta\tau_{p,l} = \frac{2}{c}d\sin(\theta_l) \tag{7}$$

where $\theta_l$ indicates azimuth of the l-th object (measured with respect to the center of the radar array), and $(x_p, y_p)$ represent the coordinates of the p-th receiving antenna. The technique for surveying the vineyard profile includes the following steps:

1) Calculation of a 2D cost function: for this purpose, a standard two-dimensional (2D) DFT procedure is used. In practice, a first one-dimensional (1D) DFT of order $N_0$ (with $N_0 \geq N$) is calculated for each antenna of the array; the spectral coefficient l-th is given by:

$$\overline{X}_{p,l} = \frac{1}{N}\sum_{n=0}^{N_0-1} x_p[n]\exp(-j2\pi n f_l T_s) \tag{8}$$

with l=0, 1, . . . , $N_0$−1; where, $$f_l = \frac{l}{N_0 T_S} \tag{9}$$

Then, another 1D DFT having order $P_0$ (with $P_0 \geq P$, where P represents the total number of receiving antennas of the ULA) is calculated as:

$$J(l, m) = \frac{1}{P} \sum_{p=0}^{P_0-1} \overline{X}_{p,l} \exp\left(-j2\pi p \frac{d}{\lambda} s_m\right) \tag{10}$$

For each $l \in \{0, 1, \ldots, N_0-1\}$;
  where, $$m \in \left[-\frac{P_0}{2}; \frac{P_0}{2} - 1\right],$$

and $s_n$ is the m-th normalized spatial frequency:

$$s_m = 2\frac{m}{P_0} \tag{11}$$

given $J(l,m)$, the cost function:

$$S(l,m) = |J(l,m)|^2 \tag{12}$$

Is calculated.

Note that the variable l is relative to the distance of the object, while the variable m to its azimuth. Indeed, given the index l, the corresponding distance to the target (eqs. (3)-(6)) becomes:

$$R_l = \frac{c}{2\mu} \frac{l}{N_0 T_S} \tag{13}$$

Similarly, the azimuth associated with a given m becomes:

$$\theta_m = \sin^{-1}\left(2\frac{m}{P_0}\right) \tag{14}$$

2) Threshold and clustering. Subsequently, a thresholding and windowing is carried out through a priori knowledge of the scenario. In this phase, all the significant values of the cost function $S(l,m)$ are found; this allows to identify all the significant values of the pairs. In practice, a set of points $\{(l_k, m_k)\}$, such that $$S(l_k, m_k) > T \tag{15}$$

for each k, where T is a suitable threshold. Subsequently, for each set of points $\{(l_k, m_k)\}$, a pair of points in Cartesian coordinates can be evaluated as:

$$\begin{cases} x_k = R_k \cdot \cos(\theta_k) \\ y_k = R_k \cdot \sin(\theta_k) \end{cases} \tag{16}$$

Subsequently, the sets of coordinates $\{(x_k, y_k)\}$ are divided into different groups (clusters) according to the position occupied. Since the geometry of the vineyard is fixed and can generally be known a priori, it is possible to consider only those points that fall within a predetermined region of space, corresponding to a predetermined region in the 2D map. If we consider two rectangular regions $S_g$, previously called "windows", with g=1, 2, characterized by the vertices, a generic point $(x_k, y_k)$ is contained in $S_g$ if the following conditions are met:

$$\begin{cases} x_{S_g} \le x_k \le x'_{S_g} \\ y_{S_g} \le y_k \le y'_{S_g} \end{cases} \tag{17}$$

3) Linear interpolation. At this point a linear interpolation is performed on the points contained in the window. In a window, the points relating to a row of vineyards must be distributed according to an IN1 or IN2 alignment and in particular the alignments obtained must be theoretically aligned approximately with the ordinate axis of the 2D map or the longitudinal development of the rectangular windows. Alignment parameters are estimated as a linear least squares solution (LLS):

$$\hat{\beta}_{S_g} = \left(X_g^T X_g\right)^{-1} X_g^T Y_g \tag{18}$$

Where $X_g$ is a matrix $N_g \times 2$:

$$X_g = \begin{bmatrix} 1 & y_1 \\ 1 & y_2 \\ \vdots & \vdots \\ 1 & y_{N_g} \end{bmatrix} \tag{19}$$

e $Y_g = [x_1, x_2, \ldots, x_{N_g}]'$, with $N_g < L$. The obtained alignments $Y_g = \beta_{S_g}[1]X_g + \beta_{S_g}[0]$ represent linear interpolations that indicate the center of the vineyard rows. In this way, when $\beta_{S_g}[1] = 0$ the linear interpolation is perfectly aligned with the ordinate axis.

Evidently, in the event that the two linear interpolations are approximately parallel to each other but not aligned with the ordinate axis of the 2D map, this means that the vehicle is not positioned correctly in the initial phase of this procedure. Then it proceeds by rotating the Cartesian reference system associated with the 2D map until the aforementioned lines become parallel to the ordinate axis. The information about the rotation carried out together with the arrangement of the rows centres is input to an autonomous driving system capable of controlling the advancement of the vehicle.

The autonomous driving system is generally per se known. According to the present invention, the latter receives at least the position of the centre of the rows as input to determine an intermediate trajectory T, which allows it to cross the vineyard causing the least possible damage. In the case of not perfect initial alignment between the vehicle and the rows, this procedure also provides this angular phase shift.

It is worth noting that the entire processing of the information acquired by the radar can be performed both in an ad hoc processing unit, suitably interfaced with the autonomous driving system, and can be implemented in the autonomous driving system itself.

In addition, the mode of advancement between the vineyards can be activated by a human operator if necessary, allowing him to input the average distance D between consecutive rows into the system, for example through a touchscreen display or a keyboard on the dashboard.

This detailed description has been described assuming that the driver of the vehicle has it aligned with the rows of a plantation, approximately in a medial position between two consecutive rows and that at that point the autonomous driving system is able to identify the appropriate trajectory to follow.

According to another preferred variant of the invention, the autonomous driving system, having acquired the 2D map described above, calculates a first interpolating straight line and, from this, calculates an angle formed with the relative ordinate axis, which in fact coincides with the longitudinal axis of the vehicle.

This angle is used to move the vehicle until it is autonomously aligned with the vineyard rows.

At this point, the autonomous driving system carries out the aforementioned filtering, for example windows, to obtain the aforementioned interpolating straight lines IN1, IN2 indicating the rows, from which to obtain the advancement trajectory T.

The present invention can be advantageously realized by means of a computer program, which comprises coding means for carrying out one or more steps of the method, when this program is executed on a computer. Therefore, it is intended that the scope of protection extends to said computer program and further to computer readable means comprising a recorded message, said computer readable means comprising program coding means for carrying out one or more steps of the method, when said program is run on a computer.

Implementation variants of the described non-limiting example are possible, without however departing from the scope of protection of the present invention as defined in the claims, including all the equivalent embodiments for a person skilled in the art.

From the above description, the person skilled in the art is able to realize the object of the invention without introducing further construction details.

The invention claimed is:

1. A computer-implemented method for identifying a trajectory of an agricultural vehicle between rows of a plantation by means of a radar interfaced with processing means of the agricultural vehicle, the method comprising:

acquiring, by one or more processors, a known approximate distance (D) between two consecutive rows of the plantation;

acquiring, by the one or more processors, signals by the radar;

processing, by the one or more processors, of the signals to obtain a two-dimensional map of points corresponding to reflections picked up by the radar by deleting points whose intensity is outside of a pre-established range;

performing, by the one or more processors, a first linear interpolation to obtain a first interpolating line (IN1) on points of greatest intensity;

generating, by the one or more processors, a window of an elongated area of the two-dimensional map having an axis of development approximately parallel to the first interpolating line;

performing, by the one or more processors, a second linear interpolation of a second interpolating line (IN2), approximately parallel to the first interpolating line (IN1), on points of greater intensity in the window;

in response at least in part to the second interpolating line (IN2) being positioned outside a distance threshold of the known approximate distance (D) from the first interpolating line (IN1):

adjusting, by the one or more processors, the pre-established range and reperforming the first linear interpolation or the second linear interpolation by deleting points whose intensity is outside of the adjusted pre-established range to calculate an updated first interpolating line or an updated second interpolating line, and selecting, by the one or more processors, a pair of the updated interpolating line and the second updated interpolating line (i) having a mutual distance within the distance threshold of the known approximate distance (D) or (ii) maximizing interpolation coefficients of the first and second interpolating lines (IN1, IN2);

in response at least in part to the second interpolating line (IN2) being positioned within the distance threshold from the first interpolating line (IN2), calculating, by the one or more processors, a trajectory (T) parallel and intermediate between the first and second interpolating lines; and autonomously operating, by the one or more processors, one or more of a propulsion system, a braking system, or a steering system of the agricultural vehicle to advance the agricultural vehicle between the two consecutive rows along the trajectory (T).

2. The computer-implemented method according to claim 1, further comprising filtering, by the one or more processors, the two-dimensional map prior to performing the first linear interpolation.

3. The computer-implemented method according to claim 2, wherein the filtering is performed by application of a Constant False Alarm Rate (CFAR) algorithm.

4. The computer-implemented method according to claim 2, wherein the filtering is performed by an additional windowing, by the one or more processors, through an area of longitudinal shape having an axis of development aligned with an ordinate axis of the two-dimensional map.

5. The computer-implemented method according to claim 1, wherein when the first interpolating line forms an angle with an ordinate axis of the two-dimensional map, the computer-implemented method further comprising storing, by the one or more processors, the angle in the processing means and performing a preliminary alignment maneuver of the agricultural vehicle with the rows of the plantation based on the stored angle.

6. The computer-implemented method according to claim 1, wherein the processing of the signals comprises a thresholding procedure which includes deleting points whose intensity is outside of a pre-established range, and the method further comprises:

varying, by the one or more processors, the pre-established range; and recalculating the first and second interpolating lines (IN1, IN2).

7. The computer-implemented method according to claim 6, further comprising stopping, by the one or more processors, the recalculation of the first and second interpolating lines (IN1, IN2) and of selecting a pair of interpolating lines having a mutual distance close to the known approximate distance (D) or maximizing interpolation coefficients of the first and second interpolating lines (IN1, IN2).

8. A non-transitory computer-readable storage medium comprising a recorded program that, when executed, causes a computer to:

acquire a known approximate distance (D) between two consecutive rows of a plantation;

acquire signals by a radar;

process of the signals to obtain a two-dimensional map of points corresponding to reflections picked up by the radar by deleting points whose intensity is outside of a pre-established range;

perform a first linear interpolation to obtain a first interpolating line (IN1) on points of greatest intensity;

generate a window of an elongated area of the two-dimensional map having an axis of development approximately parallel to the first interpolating line; perform a second linear interpolation of a second interpolating line (IN2), approximately parallel to the first interpolating line (IN1), on points of greater intensity in the window;

in response at least in part to the second interpolating line (IN2) being positioned outside a distance threshold of the known approximate distance (D) from the first interpolating line (IN1):

adjust the pre-established range and reperform the first linear interpolation or the second linear interpolation by deleting points whose intensity is outside of the adjusted pre-established range to calculate an updated first interpolating line or an updated second interpolating line, and select a pair of the updated interpolating line and the second updated interpolating line (i) having a mutual distance within the distance threshold of the known approximate distance (D) or (ii) maximizing interpolation coefficients of the first and second interpolating lines (IN1, IN2); in response at least in part to the second interpolating line (IN2) being positioned within the distance threshold from the updated first interpolating line (IN2), calculate a trajectory (T) parallel and intermediate between the first and second interpolating lines (IN1, IN2); and autonomously operate one or more of a propulsion system, a braking system, or a steering system of an agricultural vehicle to advance the agricultural vehicle between the two consecutive rows along the trajectory (T).

9. An autonomous drive system comprising:

a radar; and processing means operatively connected to the radar, wherein the processing means is configured to control a propulsion system, a braking system, and a vehicular steering system of an agricultural vehicle, wherein the processing means is configured to:

acquire a known approximate distance (D) between two consecutive rows of a plantation;

acquire signals by the radar;

process of the signals to obtain a two-dimensional map of points corresponding to reflections picked up by the radar by deleting points whose intensity is outside of a pre-established range;

perform a first linear interpolation to obtain a first interpolating line (IN1) on points of greatest intensity;

generate a window of an elongated area of the two-dimensional map having an axis of development approximately parallel to the first interpolating line;

perform a second linear interpolation of a second interpolating line (IN2), approximately parallel to the first interpolating line (IN1), on points of greater intensity in the window;

in response at least in part to the second interpolating line (IN2) being positioned outside a distance threshold of the known approximate distance (D) from the first interpolating line (IN1):

adjust the pre-established range and reperform the first linear interpolation or the second linear interpolation by deleting points whose intensity is outside of the adjusted pre-established range to calculate an updated first interpolating line or an updated second interpolating line, and select a pair of the updated interpolating line and the second updated interpolating line (i) having a mutual distance within the distance threshold of the known approximate distance (D) or (ii) maximizing interpolation coefficients of the first and second interpolating lines (IN1, IN2);

in response at least in part to the second interpolating line (IN2) being positioned within the distance threshold from the first interpolating line (IN2), calculate a trajectory (T) parallel and intermediate between the first and second interpolating lines (IN1, IN2); and autonomously operate one or more of the propulsion system, the braking system, or the vehicular steering system of the agricultural vehicle to advance the agricultural vehicle between the two consecutive rows along the trajectory (T).

\*   \*   \*   \*   \*